(12) United States Patent
Pless et al.

(10) Patent No.: US 11,491,618 B2
(45) Date of Patent: Nov. 8, 2022

(54) REHEAT STOP VALVE SUPPORT YOKE EXTRACTION DEVICE

(71) Applicant: Siemens Energy, Inc., Orlando, FL (US)

(72) Inventors: Maxwell Pless, Pittsburgh, PA (US); Bryan K. Dore, Delmont, PA (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 16/640,181

(22) PCT Filed: Aug. 21, 2017

(86) PCT No.: PCT/US2017/047753
§ 371 (c)(1),
(2) Date: Feb. 19, 2020

(87) PCT Pub. No.: WO2019/040040
PCT Pub. Date: Feb. 28, 2019

(65) Prior Publication Data
US 2020/0171633 A1 Jun. 4, 2020

(51) Int. Cl.
*B23P 19/00* (2006.01)
*B25B 27/02* (2006.01)
*B25B 27/06* (2006.01)
*B23P 19/027* (2006.01)
(Continued)

(52) U.S. Cl.
CPC .......... *B25B 27/026* (2013.01); *B25B 27/064* (2013.01); *B23P 19/027* (2013.01); *B23P 19/04* (2013.01); *B25B 27/062* (2013.01); *F05D 2230/70* (2013.01); *F16C 25/06* (2013.01)

(58) Field of Classification Search
CPC ..... B25B 27/00; B25B 27/026; B25B 27/064; B23P 19/00; B23P 19/027
See application file for complete search history.

(56) References Cited

U.S. PATENT DOCUMENTS

| 3,069,761 A | 12/1962 | Sommer |
| 3,696,496 A | 10/1972 | Corder |
| 4,648,166 A | 3/1987 | Tilman |

(Continued)

FOREIGN PATENT DOCUMENTS

| CN | 105269519 A | 1/2016 |
| CN | 206105739 U | 4/2017 |

(Continued)

OTHER PUBLICATIONS

PCT International Search Report and Written Opinion dated May 16, 2018 corresponding to PCT Application No. PCT/US2017/047753 filed Aug. 21, 2017.

*Primary Examiner* — Lee D Wilson

(57) ABSTRACT

A device to extract a support yoke from a reheat stop valve of a steam turbine is provided. The device includes a hydraulic cylinder for applying a pushing force to the support yoke, an attachment weldment for attaching the hydraulic cylinder to the reheat stop valve casing, and a conical cylinder coupled to the hydraulic cylinder and configured to evenly impart the pushing force to the support yoke from within the reheat stop valve in order to separate the reheat stop valve from the support yoke. A method to extract a support yoke from a reheat stop valve of a steam turbine is also provided.

15 Claims, 3 Drawing Sheets

(51) Int. Cl.
    *B23P 19/04*     (2006.01)
    *F16C 25/06*     (2006.01)

(56)        References Cited

U.S. PATENT DOCUMENTS 5,517,740  A      5/1996   Costlow et al.
    6,247,216  B1 *   6/2001   Rader, Jr. .............. B25B 27/064
                                                            29/252
    7,798,464  B2 *   9/2010   Brewer, III ............ F16F 1/373
                                                            248/638
    8,162,289  B2 *   4/2012   McCaleb ............ E04F 15/0247
                                                            254/98
    8,662,476  B2 *   3/2014   Weddle .................... B66F 3/25
                                                            254/93 H
 2020/0171633 A1 *    6/2020   Pless .................... B25B 27/064

FOREIGN PATENT DOCUMENTS

DE            338504 C      6/1921
    DE          20206000 U1     8/2002

* cited by examiner

REHEAT STOP VALVE SUPPORT YOKE EXTRACTION DEVICE

BACKGROUND

1. Field

The present disclosure relates generally to steams turbines and, particularly, to a device to separate two mated cylindrical components. More particularly, the disclosure relates to a device to extract a support yoke from a reheat stop valve of a steam turbine.

2. Description of the Related Art

A conventional steam turbine includes a higher pressure turbine and at least one lower pressure turbine coupled to a single shaft. Steam enters the turbine at the high pressure turbine through a stop valve and a control valve. The thermal energy of the steam is converted to mechanical energy in the higher pressure turbine, and the steam is exhausted to reheaters. In each reheater, the steam is dried, reheated, and superheated prior to its entry into the intermediate pressure turbine. The superheated steam is routed through the reheat stop valve as it travels from the reheater to the lower pressure turbine. Energy conversion occurs again in the lower pressure turbine as the steam expands into the vacuum of the main condenser.

For illustrative purposes, FIG. 1 shows a perspective view of a reheat stop valve 10 with an attached support yoke 20, also called a 'mummy case'. The support yoke 20 is designed to support the shaft and the shaft bearings on one side of the reheat stop valve 10. During routine maintenance, the reheat stop valve 10 must be disassembled which involves removing the support yoke 20 from the reheat stop valve 10. This disassembly has proven difficult as during operation high temperature steam passes through the valves creating an oxide build-up. This oxide build-up creates a tight fit where a cylindrical portion of the support yoke 20 mates within the valve casing of the reheat stop valve 10. There are no good flat sections in which to push off with the force necessary to extract the support yoke 20 from the valve casing. Thus, in order to do so, a technician must use extreme caution when pushing the support yoke 20 from the valve casing with the force necessary for extraction. In addition, by placing hydraulic cylinders between the support yoke and the valve casing, an uneven force may be applied to the support yoke 20 causing it to bind on protruding studs on the valve casing. Since there is not an ideal surface on which to rest a hydraulic cylinder, the hydraulic cylinder is often placed in an area that could compromise the technician's safety.

Consequently, a tool that allows a technician to easily extract the support yoke from the reheat stop valve during disassembly maintenance is desired.

SUMMARY

Briefly described, aspects of the present disclosure relate to a device and method to extract a support yoke from a reheat stop valve of a steam turbine as well as an assembly to separate two mated cylindrical components.

A device to extract a support yoke from a reheat stop valve of a steam turbine is provided. The device includes a hydraulic cylinder for applying a pushing force to the support yoke, an attaching means for attaching the hydraulic cylinder to the reheat stop valve casing, and a pushing means coupled to the hydraulic cylinder and configured to evenly impart the pushing force to the support yoke from within the reheat stop valve in order to separate the reheat stop valve from the support yoke.

A method to extract a support yoke from a reheat stop valve of a steam turbine is also provided. The method includes the steps of mounting an attaching means to the reheat stop valve casing, coupling a pushing means to a hydraulic cylinder, installing the hydraulic cylinder with the pushing means onto the attaching means within the reheat stop valve, and applying a pressure to the hydraulic cylinder such that the pushing means pushes the support yoke with a uniform force away from the reheat stop valve separating the support yoke and the reheat stop valve.

An assembly to separate two mated cylindrical components is also provided. The assembly includes two mated cylindrical components and a device to remove the first cylindrical component from the other mated second cylindrical component. The device includes a hydraulic cylinder for applying a pushing force to the first cylindrical component and a pushing means coupled to the hydraulic cylinder and configured to evenly impart the pushing force to the first cylindrical component in order to separate the two mated cylindrical components.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

The proposed device may be employed to efficiently remove the support yoke from the reheat stop valve casing by evenly pushing directly on the support yoke. The device may be installed within the reheat stop valve avoiding the issue that there is no ideal surface on the outer surface of the reheat stop valve casing where a device can be attached to push the two components apart.

Figure 1:
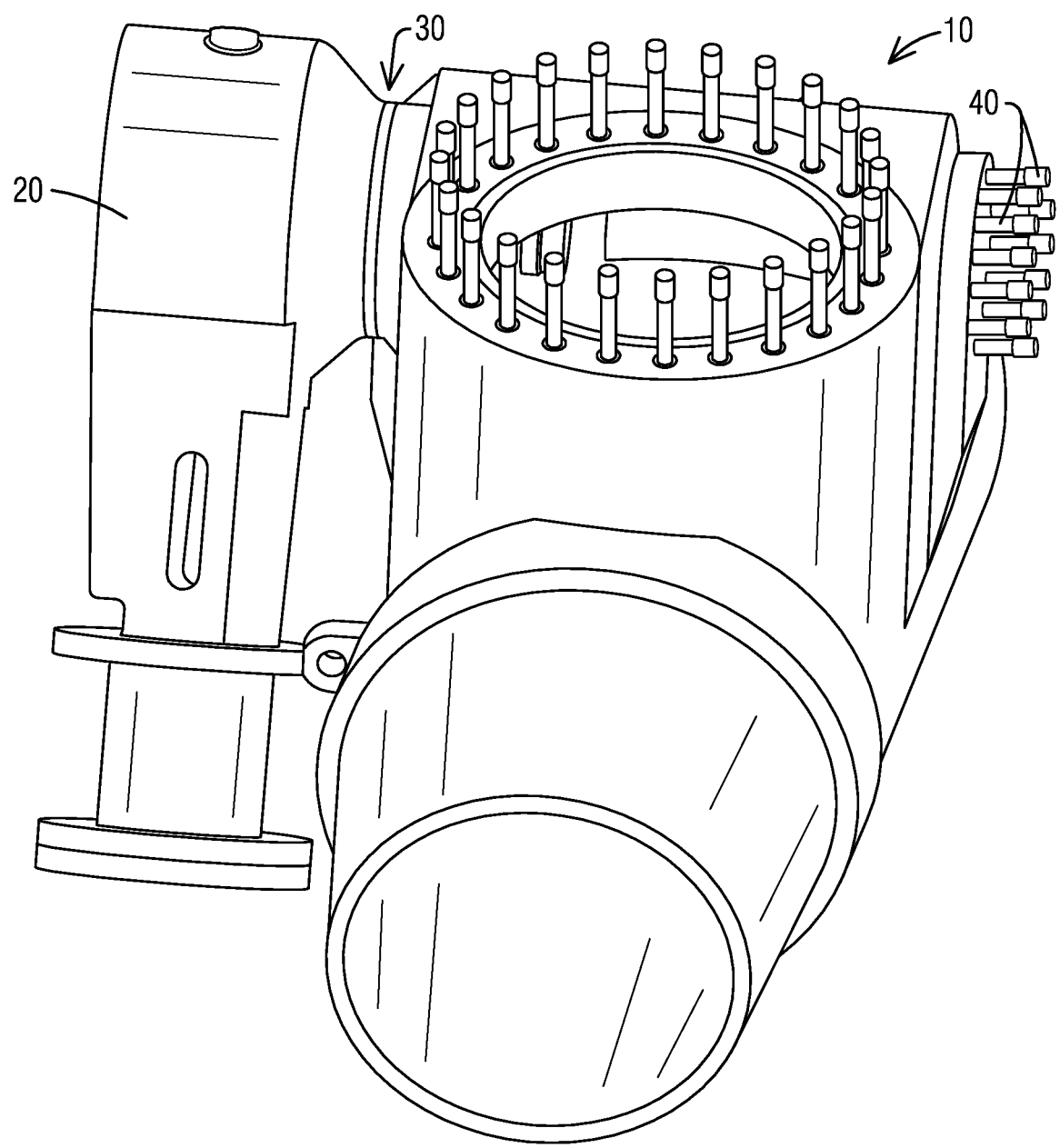
FIG. 1 illustrates a perspective view of a support yoke/reheat stop valve coupling.

Referring now to the figures, where the showings are for purposes of illustrating embodiments of the subject matter herein only and not for limiting the same, FIG. 1 illustrates a perspective view of a reheat stop valve 10 of a steam turbine with a support yoke 20 attached. This attachment may be described as a cylindrical coupling 30 where cylindrical portions of each of the reheat stop valve and the support yoke are mated.

Figure 2:
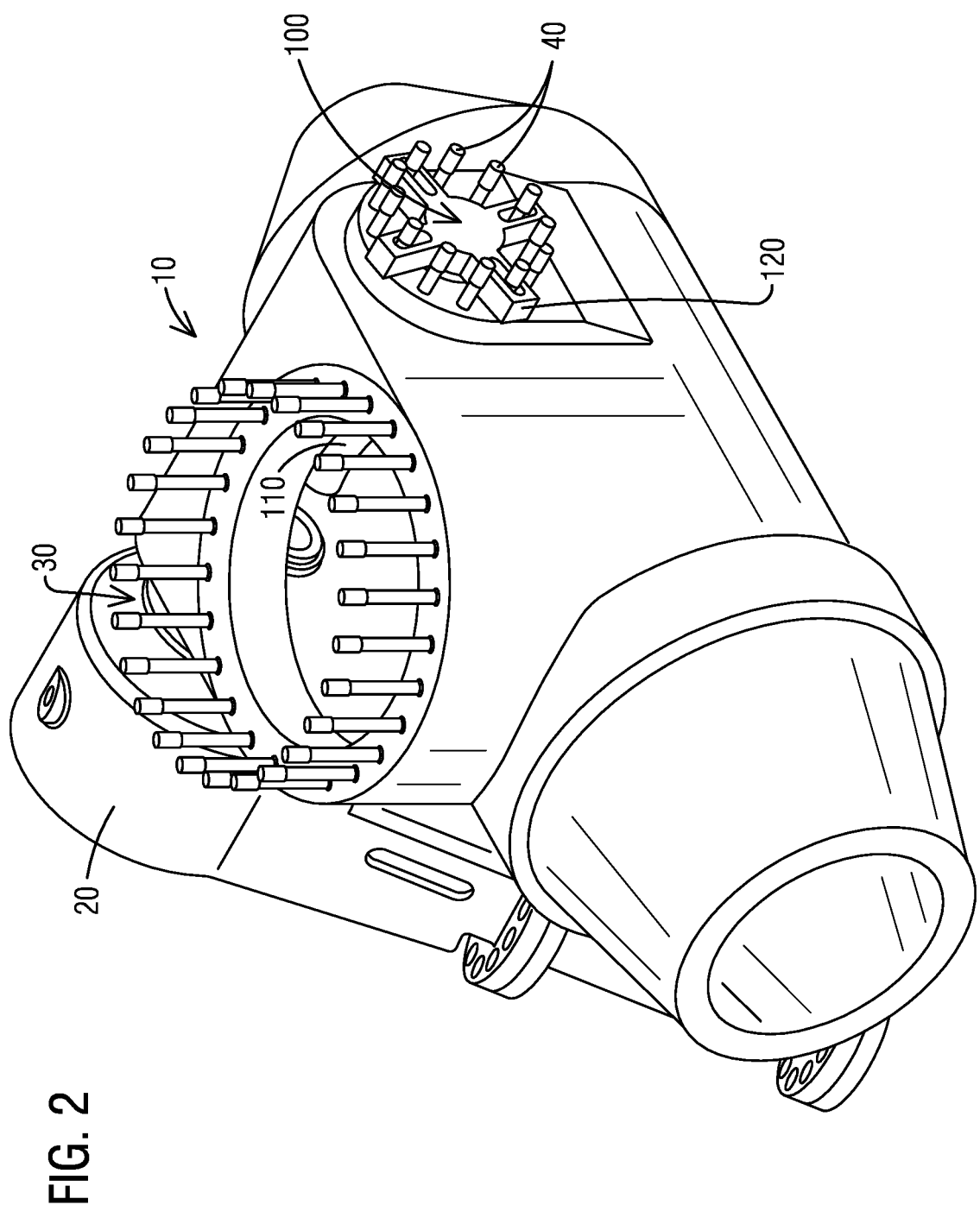
FIG. 2 illustrates a perspective view of an embodiment of a reheat stop valve with an attached support yoke and an installed device to extract the support yoke from the reheat stop valve.
Figure 3:
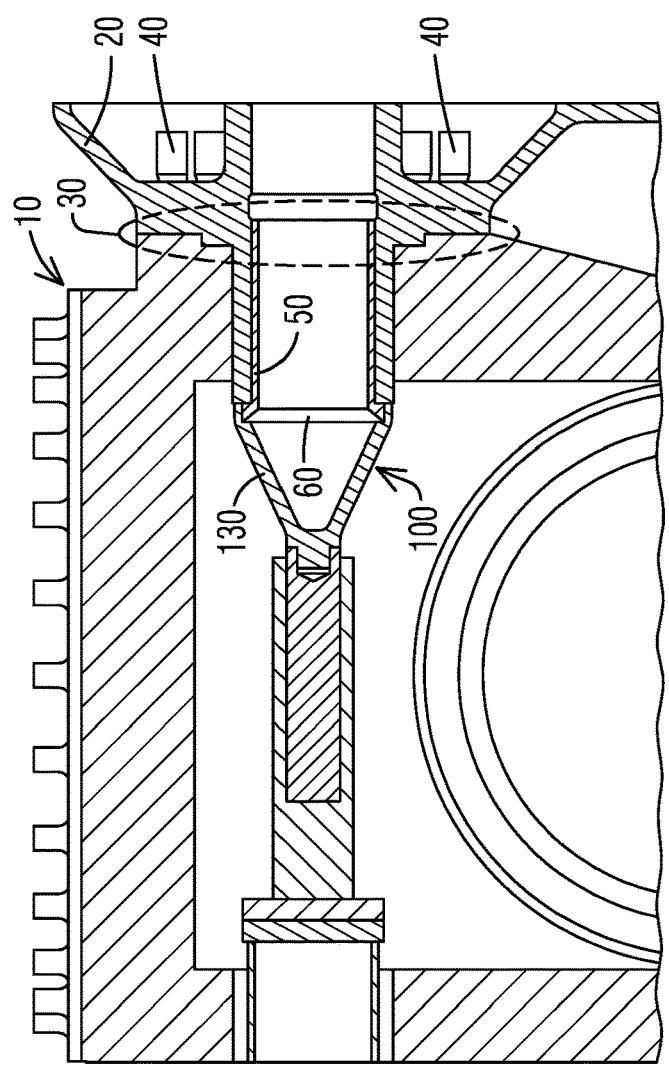
FIG. 3 illustrates a cross sectional view of the support yoke/reheat stop valve coupling.

FIG. 3 illustrates a cross sectional view of the cylindrical coupling 30 as well as a cross sectional view of a device to aid in the extraction of the support yoke 20 from the reheat stop valve 10. The device 100 is shown installed within the reheat stop valve 10. The support yoke casing 20 includes a cylindrical portion whose outer diameter may include a cylindrical contour that matches a corresponding cylindrical contour of an inner diameter of a cylindrical portion of the reheat stop valve 10. Prior to operation of the steam turbine, the support yoke cylindrical portion loosely fits within the reheat stop valve cylindrical portion so that the support yoke cylindrical portion slides within the reheat stop valve cylindrical portion. However, during operation with a flow of high temperature steam, oxides may build up at the mated surfaces creating a tight fitting joint. This tight fitting joint makes it difficult to extract the support yoke 20 from the reheat stop valve casing 10. The proposed device may aid with an extraction of the support yoke 20 from the reheat stop valve 10. The device 100 may be seen installed within the reheat stop valve 10 in both FIGS. 2 and 3.

Figure 4:
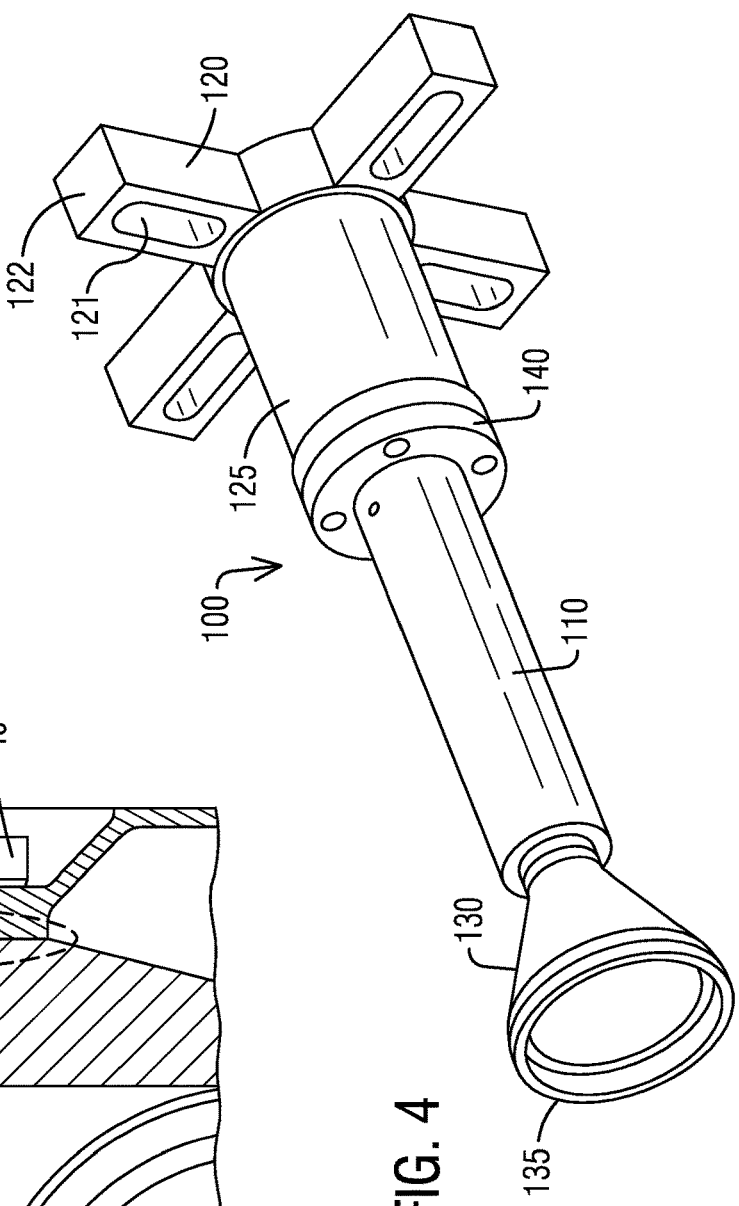
FIG. 4 illustrates a perspective view of a device to extract the support yoke from the reheat stop valve.

Referring now to FIG. 4, a perspective view of an embodiment of the device 100 to extract the support yoke 20 from the reheat stop valve 10 is illustrated. The device 100 includes a hydraulic cylinder 110 configured to apply a pushing force onto the support yoke 20 from within the reheat stop valve 10. An attaching means 120 may be used to attach the device 100 to the reheat stop valve casing. In the illustrated embodiment, the device 100 also includes a pushing means 130 coupled to the hydraulic cylinder 110 which imparts the pushing force onto the support yoke 20. The pushing means 130 is configured to evenly impart the pushing force onto a surface of the support yoke 20.

The hydraulic cylinder 110 may be a standard hydraulic cylinder with a pump to impart a hydraulic pressure via a fluid that one skilled in the art would be familiar with. A gauge notes the hydraulic pressure and may be operated manually or electronically, for example, by a user outside of the reheat stop valve 10. A length of the cylinder would enable the hydraulic cylinder 110 to span the internal cavity of the reheat stop valve 10 in order for the device 100 to reach support yoke 20. For example, in an embodiment, the length of the hydraulic cylinder 110 may be in a range of 25 to 30 inches. The hydraulic cylinder 110 may comprise aluminium, for example, so that the weight of the cylinder 110 is manageable for a technician to carry.

In an embodiment, the attachment means 120 may be a cylinder attachment weldment 120 as seen in FIG. 4. The cylinder attachment weldment 120 enables a secure mounting point that interfaces with the reheat stop valve casing 10. In an embodiment, the cylinder attachment weldment 120 includes at least one slot 121 to allow attachment via studs 40 on the reheat stop valve casing 10. An embodiment in which the cylinder attachment weldment 120 includes four slots 121 is shown in FIGS. 2 and 4. Each slot 121 is positioned on an arm 122 of the weldment 120 and receives a stud 40 on the reheat stop valve casing 10. The arms 122 may attach at a central point from which an extension tube 125 extends. Each of the arms 122 may be secured to the reheat stop valve casing 10 via the studs 40 utilizing a fastener, such as a nut, so that a face of each arm abuts the reheat stop valve casing 10. The attachment of the arms 122 to the reheat stop valve casing 10 via the studs 40 may be seen in FIG. 2.

Referring back to the illustrated embodiment of the cross sectional view of the cylindrical coupling 30 shown in FIG. 3, a casing bushing 50 is also shown. The casing bushing 50 is disposed within and concentric to the cylindrical portion of the support yoke 20. Furthermore, it is concentric to the cylindrical portion of the reheat stop valve 10. The casing bushing 50 may include a lip 60 that protrudes into the interior of the reheat stop valve 10 and includes a spherical seating surface. This spherical seating surface is considered a critical surface because it functions as a sealing surface to keep the steam within the reheat stop valve 10. Thus, it is desirable to avoid interacting with the spherical seating surface in order to prevent damaging it. In order for the device 100 to avoid interacting with the spherical seating surface, a pushing means 130 was designed to interact directly with the cylindrical portion of the support yoke 20 and avoids interaction with the casing bushing 50.

In an embodiment, the pushing means 130 is a conical cylinder, the conical cylinder configured to be coupled to the hydraulic cylinder 110. The conical cylinder 130 has been designed so that a pushing end face 135 of the conical cylinder 130 makes contact directly with an end face of the support yoke 20 and avoids interacting with the spherical seating surface of the casing bushing 50. The interior diameter of an end portion of the conical cylinder 130 includes a contour corresponding to the lipped surface 60 of the casing bushing 50 but does not make contact with the spherical seating surface. Thus, a gap exists between the interior diameter of the end portion of the conical cylinder 130 and the lipped surface 60 of the casing bushing 50. A further end of the conical cylinder 130 opposite the pushing end face 135 includes a threaded end for a threaded coupling to the hydraulic cylinder 110. A corresponding threaded portion of the hydraulic cylinder 110 receives the threaded end of the conical cylinder 130. A plurality of holes may exist in the conical cylinder 130 such that an Allen key may be used to properly torque the conical cylinder 130 onto the hydraulic cylinder 110. In an embodiment, the conical cylinder 130 may comprise bronze. Bronze may be chosen because it has good compression properties but is softer than the material typically used for the reheat stop valve casing 10 so that the device 100 would not damage the components involved in the extraction. Other materials with similar properties may also be used.

In an embodiment, the device 100 may include a mounting plate 140 disposed between the hydraulic cylinder 110 and the attaching means 120. The mounting plate 140 may include two faces, a first face mounted to an end face of the hydraulic cylinder 110 and a second face that is mounted to a face of the attachment means 120. The mounting plate 140 is utilized in order to distribute the load from the hydraulic cylinder 110 when a pushing force is applied. A material of the mounting plate may be a strong metal such as steel. A technician may also use the mounting plate 140 to index the hydraulic cylinder 110 to help develop a safe hydraulic hose line.

Referring to FIGS. 1-4, a method to extract a support yoke 20 from a reheat stop valve 10 of a steam turbine is presented. The steps of the method do not necessarily have to be performed in the order described. In an embodiment, a cylinder attachment weldment 120 is mounted to the reheat stop valve casing 10 via protruding studs 40 disposed on the reheat stop valve casing 10. In the embodiment shown in FIG. 4, the cylinder attachment weldment 120 includes at least one slot 121 so that the mounting includes sliding the slot 121 onto a protruding stud 40 and securing the weldment 120 to the reheat stop valve casing 10 via a fastener.

The hydraulic cylinder 110 may include two ends, a first end including a threaded portion, and a further end opposite the first end. The first end may then be coupled to the pushing means 130 by threading the threaded end of the pushing means onto a threaded portion of the hydraulic cylinder 110. The hydraulic cylinder with the coupled pushing means 130 may then be installed onto the attaching means 120 within the reheat stop valve 10.

Referring now to FIG. 3, a cross section of the cylindrical coupling 30 is shown. By designing the pushing means as a conical cylinder 130 having an end portion with an internal diameter that corresponds to the contour of the casing bushing 50 without contacting it, contact is only made on the outer most edge of the cylindrical portion of the support yoke 20. A pressure may be applied to the hydraulic cylinder 110 such that the pushing means 130 pushes the support yoke 20 with an even force away from the reheat stop valve 10 separating the support yoke 20 and the reheat stop valve 10.

Using a standard hydraulic cylinder, a pump coupled to the cylinder 110 by a hose may impart the hydraulic pressure necessary to separate the two components. In this manner, the technician is enabled to operate the device 100 on the exterior of the reheat stop valve 10.

The method may further include installing a mounting plate 140 onto the hydraulic cylinder 110 and the cylinder attachment weldment 120 such that the plate is mounted between the hydraulic cylinder 110 and the cylinder attachment weldment 120. The mounting plate 140, as described above, may be installed on the further end of the hydraulic cylinder 110 utilizing a plurality of fasteners, such as bolts, for example. Likewise, the plate 140 may be attached to the weldment 120 utilizing a plurality of fasteners such as bolts.

The disclosed device and method may be used to effectively apply a force directly to where it is needed even on an oddly shaped component such as a support yoke of a steam turbine engine. By pushing the component evenly, binding that may occur due to the component tilting due to uneven pushing forces is prevented. Additionally, a technician can easily install the device and with the use of the hydraulic cylindrical, apply the needed force to separate the components in a safe, quick, and reliable manner. Furthermore, one skilled in the art would understand that the device may also be used to separate two mated cylindrical components such as the main stop valve on a nuclear unit of a steam turbine. For example, the attaching means and the pushing means may be designed to separate couplings with various geometries.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A device to extract a support yoke from a reheat stop valve of a steam turbine, comprising:
    a hydraulic cylinder for applying a pushing force to the support yoke;
    an attaching means for attaching the hydraulic cylinder to the reheat stop valve casing; and
    a pushing means coupled to the hydraulic cylinder and configured to evenly impart the pushing force to the support yoke from within the reheat stop valve 10 in order to separate the reheat stop valve from the support yoke; and
    a mounting plate comprising two faces, a first face mounted to an end face of the hydraulic cylinder, and a second face mounted to the attachment means, wherein the mounting plate is utilized in order to distribute the load from the hydraulic cylinder when a pushing force is applied.

2. The device as claimed in claim 1, wherein the attaching means is a cylinder attachment weldment.

3. The device as claimed in claim 2,
    wherein the cylinder attachment weldment includes a slot disposed within an arm of the weldment,
    wherein the slot is configured to receive a stud from the reheat stop valve, and
    wherein the weldment is configured to attach to the reheat stop valve via the stud and secured by a fastener.

4. The device as claimed in claim 1, wherein the pushing means is a conical cylinder including a pushing end face configured to abut an end face of the support yoke, and wherein the pushing force is evenly imparted to the support yoke via the pushing end face.

5. The device as claimed in claim 4, wherein the conical cylinder includes a threaded end opposite the pushing end face for a threaded coupling to the hydraulic cylinder, and wherein a threaded portion of the hydraulic cylinder receives the threaded end of the conical cylinder.

6. The device as claimed in claim 1, wherein the mounting plate comprises steel.

7. The device as claimed in claim 1, wherein the hydraulic cylinder comprises aluminum.

8. The device as claimed in claim 1, wherein the length of the hydraulic cylinder lies in a range from 25 to 30 inches.

9. A method to extract a support yoke from a reheat stop valve of a steam turbine, comprising:
    mounting an attaching means to the reheat stop valve casing;
    coupling a pushing means to a hydraulic cylinder;
    installing the hydraulic cylinder with the pushing means onto the attaching means within the reheat stop valve;
    applying a pressure to the hydraulic cylinder such that the pushing means pushes the support yoke with a uniform force away from the reheat stop valve separating the support yoke and the reheat stop valve
    installing a mounting plate onto the hydraulic cylinder and the attachment weldment such that the mounting plate is between the hydraulic cylinder and the attachment weldment wherein the mounting plate distributes the load from the hydraulic cylinder when a pushing force is applied.

10. The method as claimed in claim 9, wherein the attaching means is a cylinder attachment weldment including a slot, and
    wherein the mounting includes sliding the slot onto a protruding stud on the reheat stop valve casing and securing the weldment to the casing via a fastener.

11. The method as claimed in claim 9, wherein the pushing means is a conical cylinder including a pushing end face configured to abut an end face of the support yoke, wherein the pushing force is evenly imparted to the support yoke via the pushing end face.

12. The method as claimed in claim 10, wherein the pushing means includes a threaded end, and wherein the coupling includes threading the threaded end of the pushing means onto a threaded portion of the hydraulic cylinder.

13. An assembly to separate two mated cylindrical components, comprising:
    two mated cylindrical components;

a device to remove a first cylindrical component from the other mated second cylindrical component, comprising:
   a hydraulic cylinder for applying a pushing force to the first cylindrical component; and
   a pushing means coupled to the hydraulic cylinder and configured to evenly impart the pushing force to the first cylindrical component in order to separate the two mated cylindrical components;
   a mounting plate comprising two faces, a first face mounted to an end face of the hydraulic cylinder, and a second face mounted to the attachment means, wherein the mounting plate is utilized in order to distribute the load from the hydraulic cylinder when a pushing force is applied.

14. The assembly as claimed in claim 13, further comprising an attaching means for attaching the hydraulic cylinder to the second cylindrical component such that the hydraulic cylinder evenly applies the pushing force to the first cylindrical component from within the second cylindrical component in order to separate the two mated cylindrical components.

15. The assembly as claimed in claim 13, wherein the attaching means is a plate attached to the second component via a fastener in order to provide support to the hydraulic cylinder.

\* \* \* \* \*